United States Patent [19]
Kuki et al.

[11] Patent Number: 5,018,305
[45] Date of Patent: May 28, 1991

[54] WINDOW REGULATOR APPARATUS

[75] Inventors: Nobuyuki Kuki, Toyohashi; Yukio Isomura, Chiryu; Hirokazu Suzumura, Toyota; Yoshikazu Sakakibara, Anjo, all of Japan

[73] Assignee: Aisin Seiki Kabushiki Kaisha, Japan

[21] Appl. No.: 500,291

[22] Filed: Mar. 28, 1990

[30] Foreign Application Priority Data

Mar. 29, 1989 [JP] Japan .................................... 1-35804

[51] Int. Cl.⁵ ............................................. E05F 11/38
[52] U.S. Cl. ......................................... 49/348; 49/352
[58] Field of Search ................ 49/348, 349, 350, 351, 49/352, 353, 227, 374, 375

[56] References Cited

U.S. PATENT DOCUMENTS

| | | | |
|---|---|---|---|
| 4,658,546 | 4/1987 | Moriyama | 49/352 |
| 4,669,221 | 6/1987 | Ugawa et al. | 49/352 |
| 4,821,589 | 4/1989 | Fukumoto et al. | 49/352 X |

*Primary Examiner*—Philip C. Kannan
*Attorney, Agent, or Firm*—Finnegan, Henderson, Farabow, Garrett & Dunner

[57] ABSTRACT

A window regulator apparatus includes a guide rail fixed within a vehicle door, a bracket including a window mounted on the guide rail, a driving mechanism fixed within the door for moving the window up and down the guide rail, and a resilient member mounted on the guide rail for preventing the guide rail and window glass from contacting and thereby preventing the window glass from being damaged.

9 Claims, 1 Drawing Sheet

WINDOW REGULATOR APPARATUS

BACKGROUND OF THE INVENTION

1. Field of the Invention

This invention relates generally to a window regulator apparatus, and more particularly to a wire-type window regulator.

2. Description of the Related Art

Generally, a wire-type window regulator is known in the prior art, as shown, for example, by Japanese Utility Model Laid-Open No. 62 (1987)—671. This window regulator comprises a door, a window glass supported in the door for movement upwardly and downwardly, a guide rail fixed in the door and supporting rotatable pulleys at upper and lower portions thereof, a driving mechanism laterally attached between the pulleys to the door, and a wire connected to the driving mechanism and looped around the pulleys. A bracket is connected to the window glass and attached to the wire, and contains a roller fixed thereto which is slidably mounted on the guide rail. By actuation of the driving mechanism, the wire is pulled and causes movement of the bracket on the guide rail. Thus, the window glass is moved upwardly and downwardly.

However, if force in a transverse direction is applied to the window glass in the aforesaid window regulator apparatus, the window glass as it comes down or is in a lowered position can make contact with the guide rail, and as a result be damaged.

SUMMARY OF THE INVENTION

One of the objects of the present invention is to provide an improved window regulator apparatus that overcomes the foregoing disadvantage of the prior art.

Another object of the present invention is to provide an improved window regulator apparatus, wherein a window glass is shielded by a resilient member, so that if a force in a transverse direction is applied to the window glass as the window glass comes down, or is in a lowered position, the window glass and the guide rail are prevented from making contact with each other, and damage to the window glass, such as breakage or scratching, for example, is prevented.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the window regulator apparatus of this invention comprises a guide rail, a window glass, a bracket movably supported on said guide rail, said window glass attached to said bracket, driving means for moving said bracket and thereby said window glass along said guide rail in an upward and downward direction, and a resilient member mounted on said guide rail for preventing contact between said guide rail and window glass.

The accompanying drawings, which are incorporated in and constitute a part of this specification, illustrate one embodiment of the invention and, together with the description, serve to explain the objects, advantages and principles of the invention.

DETAILED DESCRIPTION OF THE PREFERRED EMBODIMENT

Figure 1:
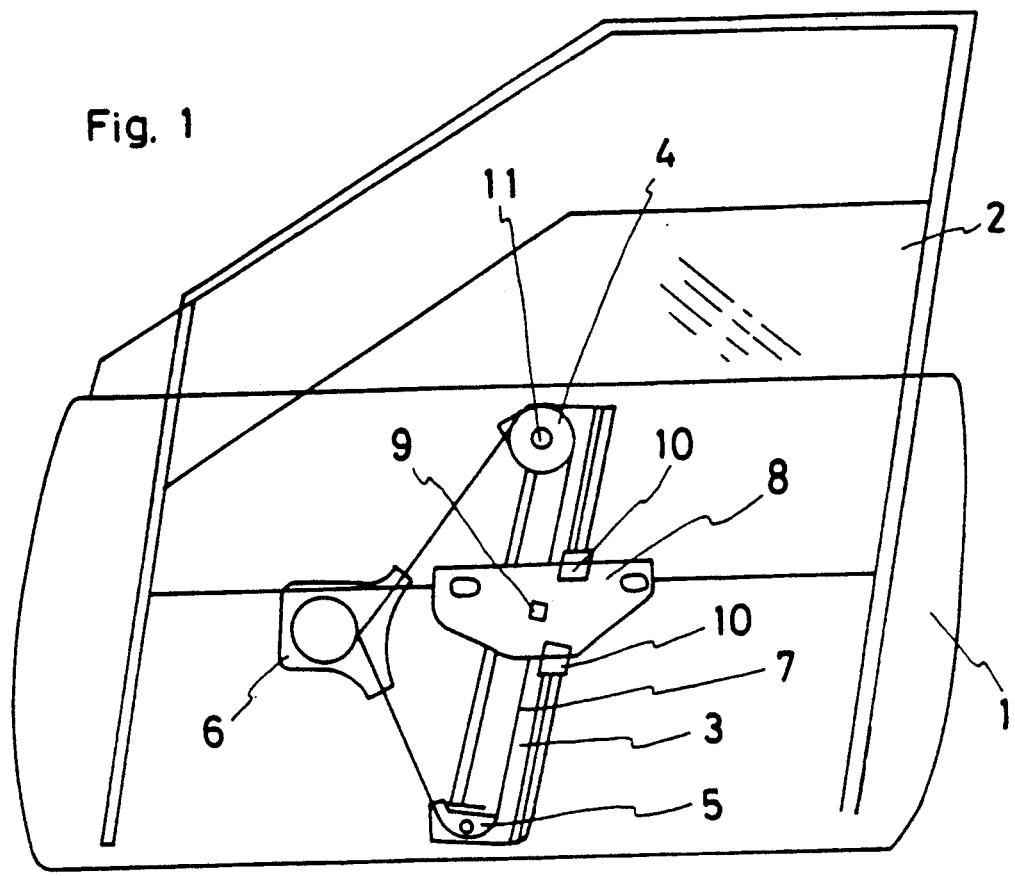
FIG. 1 shows a front view of a window regulator apparatus in elevation constructed according to the present invention.
Figure 2:
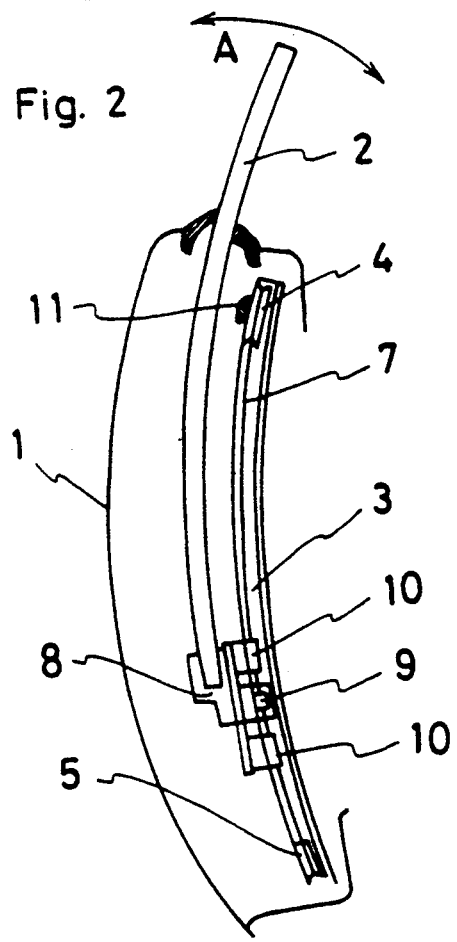
FIG. 2 is a side sectional view in elevation of FIG. 1.

Referring to FIGS. 1 and 2, a window glass 2 is shown movably disposed in a door 1 for movement up and down. A guide rail 3 is fixedly connected to the door. A guide member is rotatably mounted at the upper portion of the guide rail 3, and a guide shoe 5 is fixed at the lower portion of the guide rail 3. Preferably, guide member 4 is a pulley. A conventional driving mechanism or winder 6 is laterally spaced between the pulley 4 and the shoe 5, and a wire 7 is looped around the pulley 4 and shoe 5 and coupled to driving mechanism 6 to form a generally triangular shape, as shown. A bracket 8 is attached to a lower portion of the window glass 2, and the wire 7 is affixed to the bracket 8 through a hook 9. The bracket 8 is movably supported on guide rail 3 through shoes 10,10 and thus capable of upward and downward movement.

When the driving mechanism 5 of the window regulator apparatus is actuated, the wire 7 is caused to move around pulley 4 and shoe 5 which causes movement of the bracket 8 on guide rail 3. Because the window glass 2 is attached to bracket 8, it also moves along the guide rail 3 either upwardly or downwardly depending on the direction of actuation of the driving mechanism 5.

Figure 3:
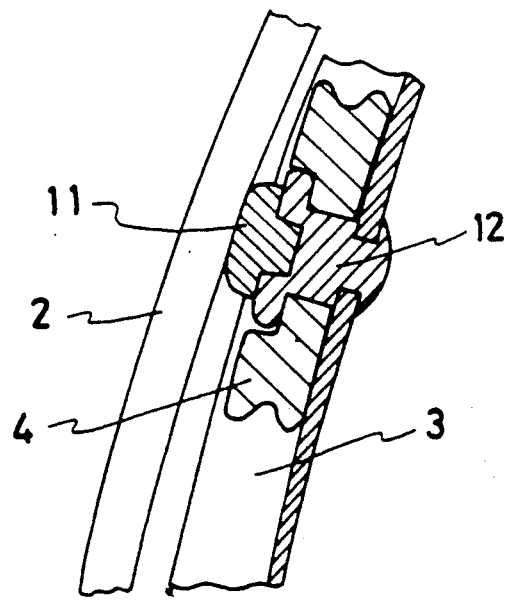
FIG. 3 is a view similar to FIG. 2, however, showing an enlarged portion of the window regulator apparatus.

As shown in FIGS. 1 to 3, a resilient member 11 is fixedly connected to a head portion of a pin 12. This pin 12 serves as the pivot shaft of the pulley 4 which is rotatably supported on the pin at the top portion of the guide rail 3. Accordingly, the window glass 2 will be contacted by the resilient member 11, and contact between the guide rail 3 and the window glass 2 will be prevented. Thus, if a force in the transverse direction (direction A shown in FIG. 2) is applied to the window glass 2 when the window glass 2 is in a partly or fully lowered position, the window glass 2 and the guide rail 3 are prevented from making contact, and the window glass 2 is prevented from being damaged. As shown in FIG. 3, the resilient member 11 is preferably in the shape of a resilient plug. By providing resilient member 11, it is not necessary to provide clearance between the window glass 2 and the guide rail 3 for preventing contact, and thus it is possible to reduce the width of the door 1.

According to the present invention, the window regulator apparatus includes the window glass 2 movably supported within the door 1 for upward and downward movement, the guide rail 3 fixedly connected to the door 1 and rotatably supporting the pulley 4 at the upper portion of the guide rail 3, the driving mechanism 6 laterally mounted between the pulley 4 and the shoe 5 within the door 1, the wire 7 looped around the pulley 4 and shoe 5 and driving mechanism 6, and the bracket 8 fixed to the window glass 2 and connected to the wire 7. The resilient member 11 is attached to the head portion of the pin 12 which is the pivot shaft of the pulley 4 of guide rail 3. Accordingly, the window glass 2 and the guide rail 3 are prevented from making contact when the glass 2 is lowered within door 1, and damage to the window glass 2 is prevented. Furthermore, it is no longer necessary to provide clearance between the window glass 2 and the guide rail 3, providing as an additional advantage the capability of reducing the width of the door 4.

As alternatives, the resilient member 11 can be directly mounted on the guide rail 3 or the pulley 4, and the same objects, advantages and results will be attained as in the embodiment described above.

The invention which is intended to be protected herein should not be construed as limited to the particular forms disclosed, as these are to be regarded as illustrative rather than restrictive. Variations and changes may thus be made by those skilled in the art without departing from the scope and spirit of the invention as set forth in the appended claims and their equivalents.

What is claimed is:

1. A window regulator apparatus, comprising:
   a guide rail;
   a window glass;
   a bracket movably supported on said guide rail, said window glass attached to said bracket in a position normally spaced from said guide rail;
   driving means for moving said bracket along said rail in an upward and downward direction, said window glass being moved with said bracket normally in a path generally spaced from said rail; and
   a resilient member mounted on said guide rail for preventing contact between said guide rail and window glass in the event of a transverse force applied to said window glass in a direction moving said glass out of said path toward said guide rail.

2. A window regulator apparatus as set forth in claim 1, further comprising a guide member mounted on said guide rail.

3. A window regulator apparatus as set forth in claim 2, wherein said guide member is a pulley.

4. A window regulator apparatus as set forth in claim 3, wherein said resilient member is mounted on said pulley.

5. A window regulator apparatus as set forth in claim 3 further comprising a pin connected to said guide rail, said pulley rotatably supported on said pin.

6. A window regulator apparatus as set forth in claim 5, wherein said resilient member is mounted on said pin.

7. A window regulator apparatus for mounting within a vehicle door, comprising:
   a guide rail connected within the door;
   a guide member mounted on said guide rail;
   a window glass;
   a bracket movably supported on said guide rail, said window glass attached to said bracket in a position normally spaced from said guide rail;
   driving means mounted within the door for moving said bracket and thereby said window glass up and down said guide rail, said window glass being moved with said bracket normally in a path generally spaced from said guide rail;
   a wire extending between said driving means and said bracket, said wire extending around said guide member and serving to transmit a moving force from said driving means to said bracket; and
   a resilient member mounted on said guide member for preventing contact between said guide rail and window glass in the event of a transverse force applied to said window glass in a direction to move said glass toward said guide rail.

8. A window regulator apparatus as set forth in claim 7, wherein said guide member is a pulley and said resilient member is mounted on said pulley.

9. A window regulator as set forth in claim 8, further comprising a pin connected to said guide rail, said pulley rotatably supported on said pin and said resilient member mounted on said pin.

* * * * *